ULTRAREF United States Patent [19]
Kaiser, Jr.
[11] 3,751,606
[45] Aug. 7, 1973

[54] LOOP FAULT LOCATOR

[75] Inventor: Charles William Kaiser, Jr., Somerville, N.J.

[73] Assignee: Bell Telephone Laboratories, Incorporated, Murray Hill, Berkeley Heights, N.J.

[22] Filed: Dec. 29, 1971

[21] Appl. No.: 213,663

[52] U.S. Cl. .................. 179/175.3, 324/52
[51] Int. Cl. .................. H04b 3/46
[58] Field of Search .................. 179/175.3; 324/51, 324/52, 54, 60 B

[56] References Cited

UNITED STATES PATENTS 2,490,377 12/1949 MacLean .................. 324/52
3,517,306 6/1970 Anderson et al. .................. 179/175.3
2,492,150 12/1949 Himmel .................. 179/175.3

*Primary Examiner*—Kathleen H. Claffy
*Assistant Examiner*—Douglas W. Olms
*Attorney*—W. L. Keefauver et al.

[57] ABSTRACT

A fault on a telephone cable pair which may contain other impedance irregularities is located by a frequency-domain distance detection system. The difference between the input impedance of the circuit which contains the fault and a standard impedance is measured periodically across a set of predetermined frequency bands to produce a corresponding set of periodic time functions. The power spectra of these functions are determined, and the frequencies of the spectra mamima are used to estimate the distances to all of the impedance irregularities (including the fault) from the measurement point.

6 Claims, 15 Drawing Figures

ANALOG IMPLEMENTATION

VOLTAGE REFLECTION COEFFICIENTS $$r_1 = -\frac{1}{3} \qquad \rho_B = \frac{Z_B - Z_0}{Z_B + Z_0}$$

$$r_2 = \frac{Z_2}{Z_2 + 2Z_0} \qquad \rho_3 = \frac{Z_3 - Z_0}{Z_B + Z_0}$$

ANALOG IMPLEMENTATION

SELECTED TERMS FROM EQUATION (2)

$A_1(f)e^{-2\alpha(f)d_1}\cos(2K_1 d_1 f + \phi_1)$ $A_4(f)e^{-2\alpha(f)d_4}\cos(2K_1 d_4 f + \phi_4)$ Re RL (f)

TYPICAL EXAMPLES OF EQUATIONS (5) -(9)

DIGITAL IMPLEMENTATION

FIG. 8
POWER SPECTRUM OF g(t)
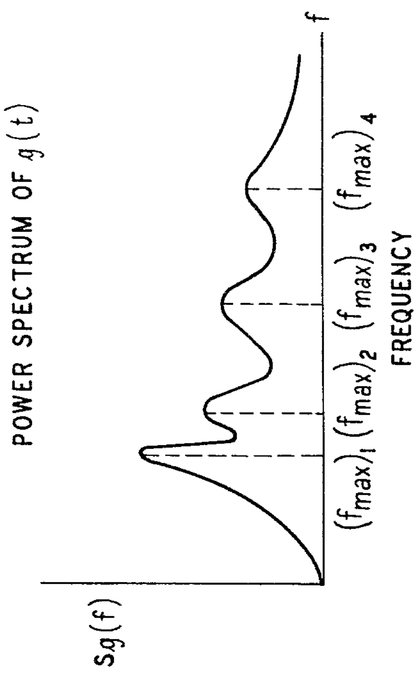
FIG. 9A
FAULT IN TWO DISTANCE WINDOWS
POWER SPECTRUM
FREQUENCY BAND : 10 - 498 kHz
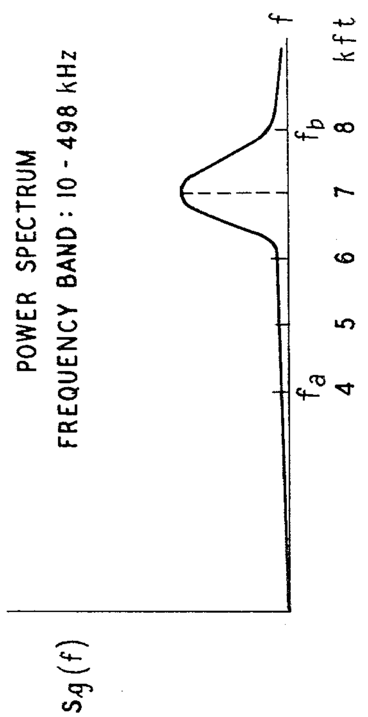
FIG. 9B
POWER SPECTRUM
FREQUENCY BAND : 10 - 335 kHz
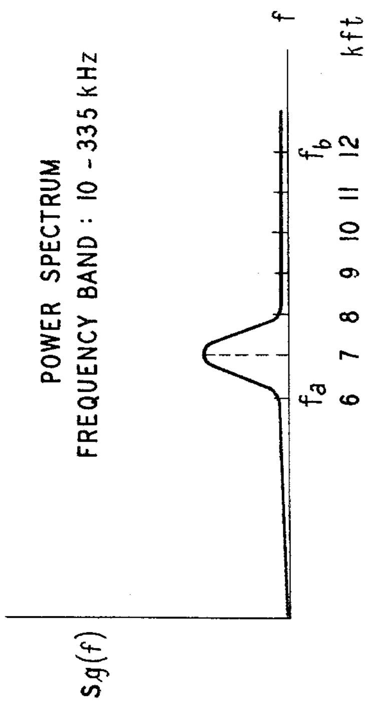
FIG. 10
| | FREQUENCY BAND | DISTANCE WINDOW |
|---|---|---|
| 1. | 10 - 1354 kHz | 1.5 - 3 kft |
| 2. | 10 - 1018 kHz | 2 - 4 kft |
| 3. | 10 - 669 kHz | 3 - 6 kft |
| 4. | 10 - 498 kHz | 4 - 8 kft |
| 5. | 10 - 335 kHz | 6 - 12 kft |
| 6. | 10 - 253 kHz | 8 - 16 kft |
| 7. | 10 - 170 kHz | 12 - 24 kft |
| 8. | 10 - 128 kHz | 16 - 32 kft |

LOOP FAULT LOCATOR

FIELD OF THE INVENTION

This invention relates to communications transmission line fault location in general; and in particular concerns a loop fault locator to be used from a centralized position.

BACKGROUND OF THE INVENTION

In telephone loops, a number of common faults occur from time to time that must be detected, located, and repaired. Principally, these include: two-sided faults (both tip and ring wires of a pair faulted at one point) such as shorts and opens, for example, and one-sided faults (either tip or ring wire of a pair faulted at one point) such as opens, grounds, crosses, etc.; and trace to manufacturing defects or, more usually, physical damage to the cable in usage.

Locating each fault expeditiously and inexpensively has in the past proved no easy matter. After the Repair Service Bureau determines that a fault is outside the central office, a station repairman usually is sent to the customer's premises to inspect the telephone set. If the trouble is not there, a cable repairman subsequently makes several dc or low frequency measurements at accessible points along the cable pair with a few portable test sets which are selected from his truck based on the type of fault. His objective is to sectionalize, localize, and ultimately pinpoint the fault, and then repair it. The location process involves considerable time and expense.

In the inspection of coaxial cable after manufacture, although not elsewhere to the applicant's knowledge, a system of fault detection has been used which relies on swept frequency output over a bandwidth of, for example, 2.0 to 12.4 GHz. In this system, the types of coaxial cable fault being sought can, for example, be a nonterminated end, a large impedance irregularity such as a depression in the outer tube, etc. A sweep oscillator output is connected to the cable, and a discontinuity produces a reflection which combines with the incident signal at a crystal detector with a phase relationship that varies with both the distance to the discontinuity and the signal frequency. The number of "ripples" appearing across the full width of a display is a measure of the distance from the discontinuity to the detector. If there are faults at two locations in the cable, the vector sum of the two ripple patterns will be displayed, and the component ripples associated with each fault must be distinguished visually in order to locate the faults.

The adaption of a swept frequency system of the type described to the location of telphone loop faults is not trivial. Nonloaded multipair telephone cable ranges typically up to 18,000 feet in installed length and has a loss and propagation velocity which are strongly frequency dependent. As the measurement bandwidth is swept from low to high frequencies, increasing loss causes the ripple amplitude to decrease monotonically and increasing propagation velocity causes the ripple period to increase monotonically. In contrast, swept frequency techniques of the prior art were addressed to coaxial cable less than 100 feet in length which has a relatively constant loss and propagation velocity across the entire swept bandwidth. These differences together with the high probability of nonfault-type impedance irregularities on telephone loops such as gauge changes and bridged taps, for example, make the interpretation of the output "ripple" signal, at least in its raw visual form, difficult and in most cases impossible.

More generally, by far the preferred approach to loop fault detection is from a central automated desk located in each central office, or centrally with respect to several such offices, thereby minimizing duplicate items of test equipment and physical inspections along a cable route.

The following are the invention's objects:

to reduce the cost and time of fault location on telephone cable pairs;

to provide an unambiguous visual interpretation or an unambiguous automated interpretation of the output signal from a swept frequency differential impedance measurement of a telephone loop suspected of having faults but known to have impedance irregularities; and to centralize the function of locating loop faults.

SUMMARY OF THE INVENTION

The foregoing and other inventive objects are achieved by a swept frequency system in which by applying successively different sweep bands, successively longer sections of an entire telephone cable pair are in turn investigated.

Thus, pursuant to one aspect of the invention, the different sweep bands—for example, eight different bands—correspond to cable pair sections which overlap. A given irregularity thus appears as a spectrum peak in at least two of the spectra because these spectra correspond to cable pair sections that contain the irregularity.

Pursuant to another aspect of the invention, the basic procedure involves measuring either the real or imaginary part of the complex return loss over a frequency range of several octaves above 10 kHz. A periodic time function $g(t)$ is generated by a periodic sweeping or sampling across the measurement bandwidth. The power spectrum of the function $g(t)$ is determined; and the frequencies of the power spectrum maxima are used to estimate the distances from the measurement point to the impedance irregularities on the loop.

In a specific embodiment of the invention, an analog-to-digital converter is used to sample and digitalize the analog voltage $g(t)$; and a computer is used to perform a digital spectrum analysis of this sampled time function. Several large impedance irregularities can be located simultaneously on nonloaded loops pursuant to the teachings of this invention.

The invention and its further objects, features, and advantages will be more readily appreciated from a reading of the description to follow of the detailed embodiment thereof.

BRIEF DESCRIPTION OF THE DRAWING

FIG. 8 is a graph depicting maxima of the power spectrum of a swept frequency signal $g(t)$;

FIGS. 9A and 9B depict fault detection by visual means; and

FIG. 10 is a table demonstrating various distance windows as functions of swept frequency band.

DETAILED DESCRIPTION OF ILLUSTRATIVE EMBODIMENT

Figure 1:
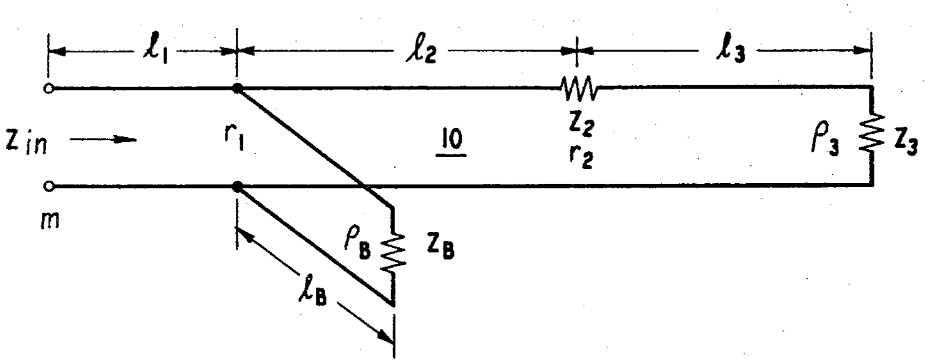
FIg. 1 is a schematic circuit diagram of several impedance irregularities present in a loop.

The transmission line model of a balanced cable pair designated 10 in FIG. 1 has, by way of example, four lumped impedance irregularities. The impedances designated by $Z_B$ and $Z_3$ are shorts and the impedance $Z_2$ is a one-sided open. The fourth irregularity is caused by a bridged tap, not a fault, and is located at the junction point. The distances from the terminals $m$ in a central office to the impedance irregularities are:

$d_1 = l_1$ $d_2 = l_1 + l_B$ $d_3 = l_1 + l_2$ $d_4 = l_1 + l_2 + l_3$

The objective is to determine the distances $d_{1-4}$ from single-ended measurements made at the terminals $m$.

THEORY

A complex return loss $RL$ can be defined by:

$$RL \triangleq (Z_{in} - Z_s)/(Z_{in} + Z_s) \quad (1)$$

where $Z_{in}$ is the complex imput impedance of the faulted circuit as shown in FIG. 1 and $Z_s$ is a complex standard impedance. The quantity $RL$ is measured as a function of frequency at the central office.

It can be shown that the real part of the return loss $RL$ as a function of frequency is:

$$\underline{\mathrm{Re}}\,RL(f) = A_0(f) + \sum_{i=1}^{4}[e^{-2\alpha(f)d_i}][A_i(f)\cos(2K_1 d_i f + \phi_i)] + \underline{\mathrm{Re}}(\mathrm{M.R.T.}) \quad (2)$$

where $$\phi_i = 2K_2\, d_i;\ (i = 1\text{–}4) \quad (3)$$

$A_0(f)$ is approximately a dc term generated by any impedance mismatch at the measurement point; $A_i(f)$ are coefficients which vary much slower than the cosine function with increasing frequency and therefore they can reasonably be assumed to be frequency independent; $\alpha$ is the line attenuation constant; $d_i$ are the distances from the measurement point to the four impedance irregularities; $K_1$ and $K_2$ are known constants selected to approximate the line phase constant $\beta$ as a linear function of frequency:

$$\beta(f) = K_1 f + K_2 \quad (4)$$

and M.R.T. stands for the multiple reflection terms that will be ignored.

Figure 2A:
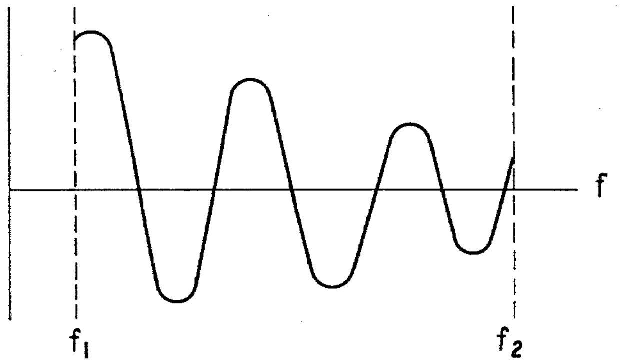
FIGS. 2A, 2B, and 2C are graphs of terms present in Equation (2)
Figure 2B:
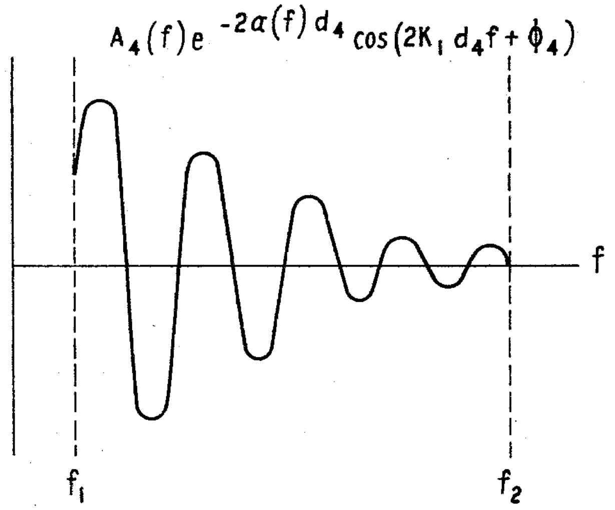
Figure 2C:
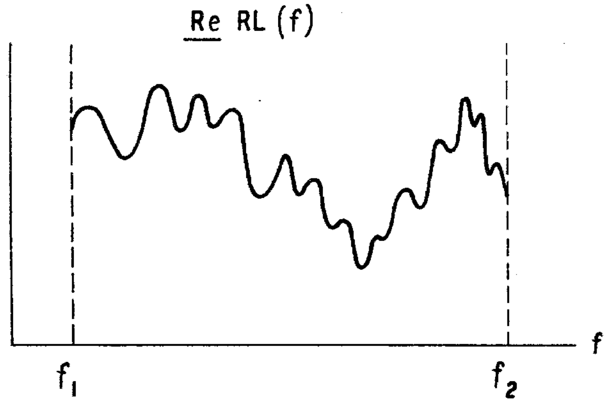

After expanding the summation indicated in Equation (2) it will be seen that the second through the fifth terms are similar functions respectively of the distances to the four irregularities. Each of these terms is an exponentially damped sinusoid as a function of increasing frequency. The frequencies of sinusoidal variation are linearly related to the distances $d_{1-4}$ to the impedance irregularities. The second such term is shown in FIG. 2A and the fifth such term is shown in FIG. 2B for purposes of comparison. The real part of $RL(f)$ which is the sum of all these terms, is shown in FIG. 2C.

Pursuant to one of the inventive objects, the strategy is to determine the distances $d_i$ from the terminals $m$ to the impedance irregularities by measuring the four frequencies of sinusoidal variation indicated in the second through fifth terms respectively of Equation (2).

Fourier analysis may be used to determine the frequency content of periodic functions.

Consequently, a set of periodic time functions $P_i(t)$ is defined as follows:

$$P_i(t) \triangleq \sum_{n=-\infty}^{\infty} a_i(t - nT) \quad (i = 0-4) \quad (5)$$

where $$t \triangleq \left(\frac{f - f_1}{f_2 - f_1}\right) f_r T \quad \begin{cases} 0 < f_r \le 0.5 \\ f_1 \le f \le f_2 \end{cases} \quad (6)$$

$$a_0(t) \triangleq \begin{cases} A_0(f) & 0 \le t \le f_r T \\ 0 & -\infty < t < 0;\ f_r T < t < \infty \end{cases} \quad (7)$$

$$a_i(t) \triangleq \begin{cases} A_i(f) e^{-2\alpha(f)d_i} \cos(2K_1 d_i f + \phi_i) & \begin{cases} i = 1-4 \\ 0 \le t \le f_r T \end{cases} \\ 0 & -\infty < t < 0;\ f_r T < t < \infty \end{cases} \quad (8)$$

Figure 3A:
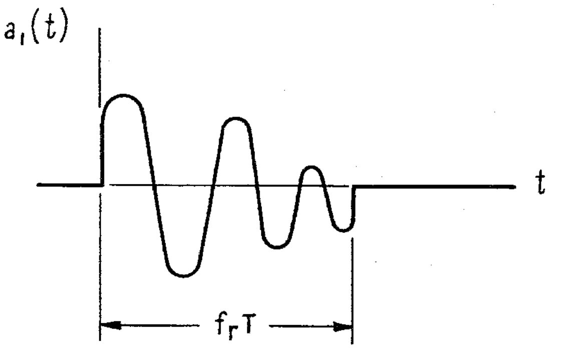
FIGS. 3A, 3B, 3C depict typical graphs of Equations (5–9)
Figure 3B:
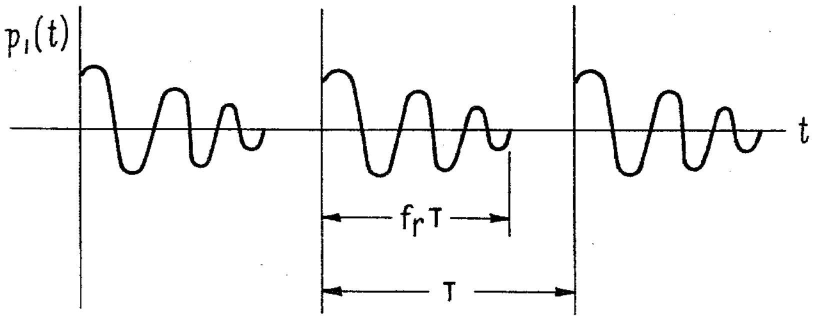

Examples of $a_i(t)$ and $P_i(t)$ are illustrated in FIGS. 3A and 3B respectively.

Figure 3C:
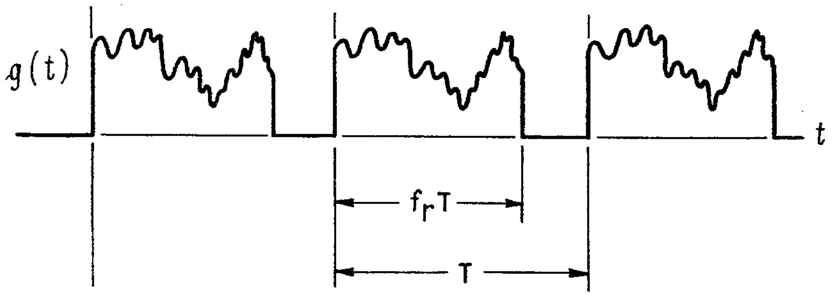

Consider now a function $g(t)$ defined as follows:

$$g(t) \triangleq \sum_{i=0}^{4} P_i(t) + (\mathrm{M.R.T.}) \quad (9)$$

which is just a periodic generation of the function $Re\ RL(f)$. (See FIG. 3C.)

It can be shown that the power spectrum of $P_i(t)$ where $i = 1$–$4$ has a maximum at:

$$(f_{max})_i = [K_1 (f_2 - f_1) d_i]/[\pi f_r T] \ (i = 1\text{–}4) \quad (10)$$

Since $g(t)$ is a sum of $P_i(t)$ terms, its power spectrum will have four maxima at the frequencies given by Equation (10) provided the $P_0(t)$ term and the multiple reflection terms of Equation (9) can be neglected; and provided further the four maxima are sufficiently separated in frequency that interaction among the frequency spectra of the second through the fifth terms does not significantly affect their locations.

These assumptions are reasonable and valid for the application of the present invention to telephone loop fault location. It follows that estimates of the distances $d_{1-4}$ to the four lumped impedance irregularities of the transmission line model of FIG. 1 are $$\hat{d}_i = [\pi f_r T (f_{max})_i]/[K_1 (f_2 - f_1)] \quad (i = 1\text{–}4) \tag{11}$$

It should be noted that as bandwidth changes, the value of $(f_{max})_i$ changes also, since the distance $d_i$ is of course the same. Thus, the fixed distance appears at different frequencies.

IMPLEMENTATION

Figure 4:
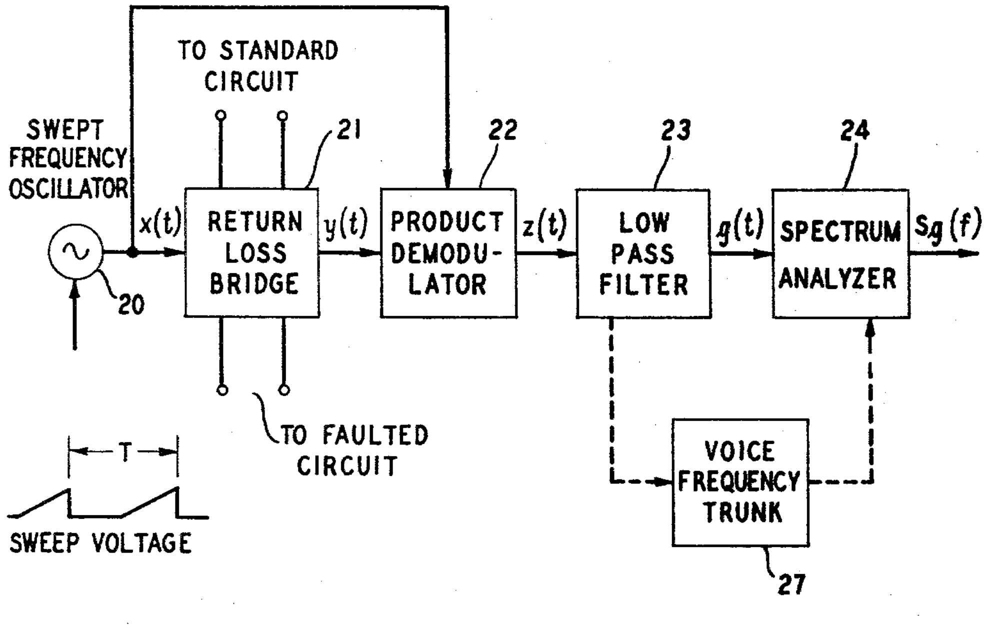
FIG. 4 is a circuit block diagram of an analog implementation of the invention.
Figure 5:
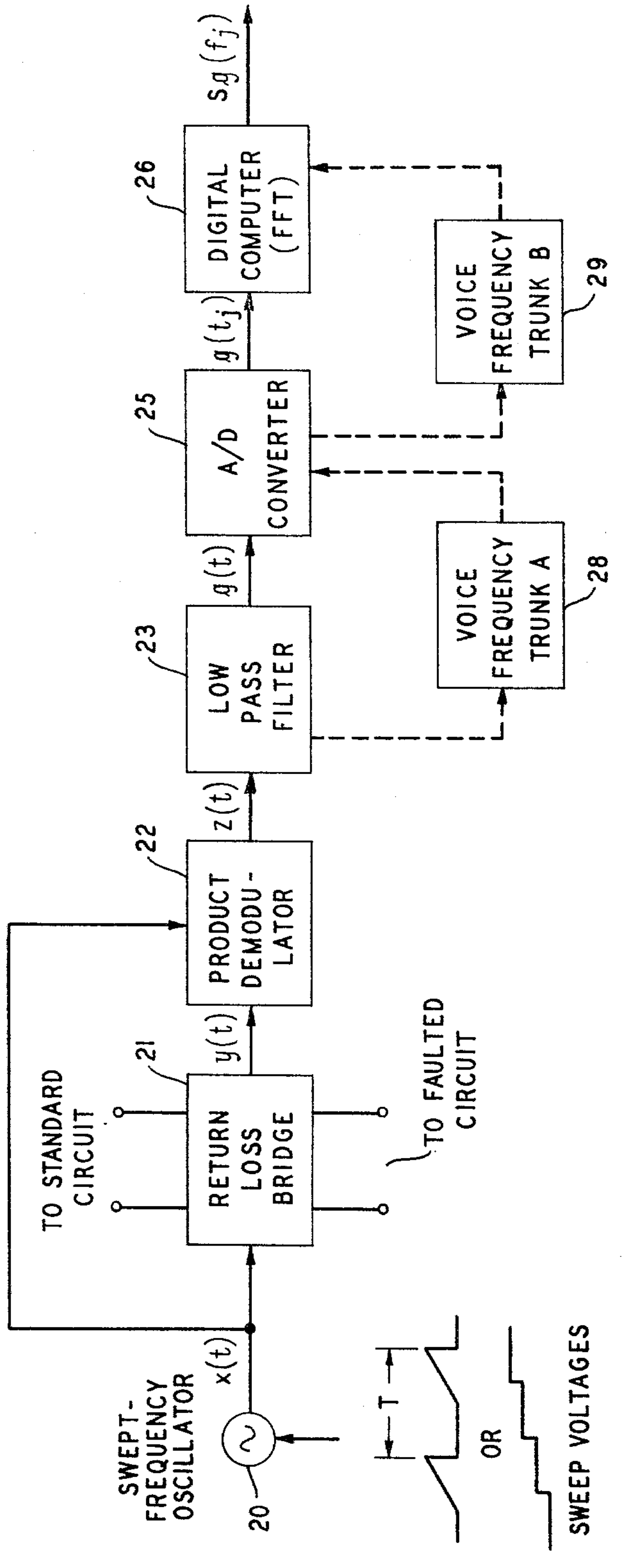
FIG. 5 is a circuit block diagram of a digital implementation.
Figure 6:
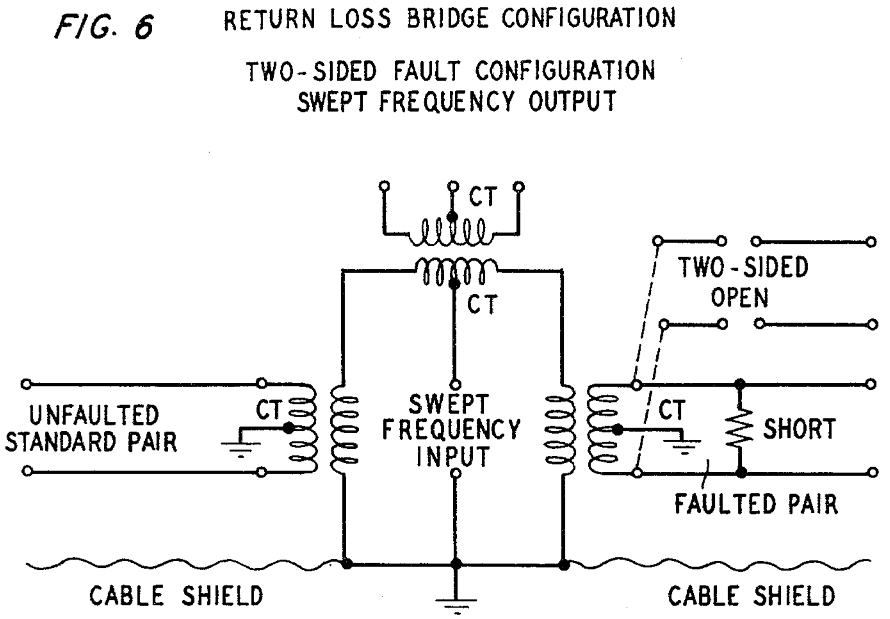
FIG. 6 is a schematic diagram of a return loss bridge usable with a two-sided or one-sided fault configuration.
Figure 7:
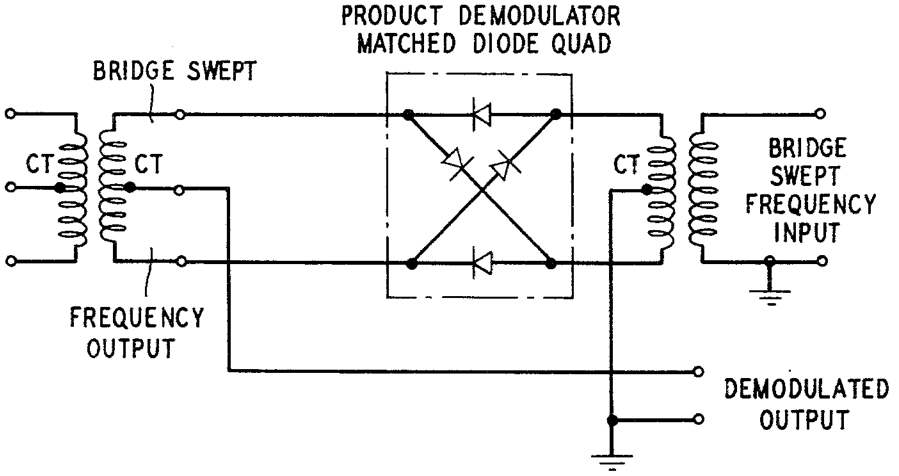
FIG. 7 is a circuit schematic diagram of the product demodulator.

Implementation of the above-described fault-location technique is set out in block diagram form for analog and digital versions respectively in FIGS. 4 and 5. A swept frequency oscillator 20 for the analog form generates a constant amplitude cosine wave output which is swept to increase its frequency linearly by a ramp function as shown in FIG. 4. The swept frequency wave is applied to a return loss bridge 21. An example of a return loss bridge is shown in FIG. 6. The standard circuit can be another cable pair which is similar in makeup to the faulted pair or a discrete network which approximates the characteristic impedance of the faulted pair. An appropriate product demodulator is shown in FIG. 7.

From linear system theory, if the input to the return loss bridge 21 is a steady-state cosine wave (no sweep voltage), $$x(t) = \cos \omega_o t \tag{12}$$

then the output of the bridge 21 is given by:

$$y(t) = [Re\, RL(f_0)]\cos \omega_o t - [Im\, RL(f_0)]\sin \omega_o t \tag{13}$$

where $\omega_o = 2\pi f_0$. The output of the product demodulator 22 is:

$$z(t) = [x(t)][y(t)] \tag{14}$$

$$z(t) = \{\cos \omega_o t\}\{[Re\, RL(f_0)]\cos \omega_o t - [Im\, RL(f_0)]\sin \omega_o t\} \tag{15}$$

$$z(t) = [ReRL(f_0)]\cos^2\omega_o t - [ImRL(f_0)]\sin \omega_o t \cos \omega_o t \tag{16}$$

$$z(t) = ½[ReRL(f_0)] + ½[ReRL(f_0)]\cos 2\omega_o t - ½[ImRL(f_0)]\sin 2\omega_o t \tag{17}$$

If the cutoff frequency of the low-pass filter 23 is much lower than $\omega_o$, then the output of the low-pass filter 23 is:

$$g(t) = ½[Re\, RL(f_0)] \tag{18}$$

Furthermore, if the cosine wave input to the return loss bridge 21 is swept with period $T$ as shown in FIG. 4, $g(t)$ will correspond to the mathematical function defined by Equation (9). Hence, the frequencies of the maxima of $S_g(f)$, the power spectrum of $g(t)$, can be substituted in Equation (11) to estimate the distances to the impedance irregularities on the line. The spectrum analyzer 24 portrays $S_g(f)$ as a function of frequency—in other words the power spectrum of $g(t)$—and this spectrum is illustrated in FIG. 8 where the frequency maxima $(f_{max})_{1-4}$ corresponding to the four impedance irregularities shown in FIG. 1 can be identified. Spectrum peaks that correspond to impedance irregularities with identical voltage reflection coefficients decrease monotonically in amplitude with increasing frequency as illustrated by the peaks in FIG. 8, because energy reflected from the first irregularity does not propagate to the irregularities beyond and also because the round-trip attenuation to the first irregularity is less than that to the irregularities beyond. Consequently, the power spectrum can be multiplied by a monotonically increasing function of frequency such as a ramp function, for example, to make all of the peaks approximately uniform in amplitude. This facilitates both the visual interpretation of the power spectrum as well as the automated interpretation by means of a simple device such as a threshold detector, for example.

A second implementation of the present invention is the digital version shown in FIG. 5 which differs from the analog case in that an *a/d* converter 25 is used to sample and digitalize the analog voltage output $g(t)$ of filter 23. A digital computer 26 is used to perform a digital spectrum analysis of the sampled time function $g(t_i)$.

The samples can be obtained in two ways. First, the period of the sweep voltage T shown in FIG. 5, and the sampling rate of the *a/d* converter 25 can be adjusted to obtain an adequate number of samples during one period of $g(t)$. Alternatively, a staircase function can be used for the sweep voltage. The latter permits each sample to be taken as a steady state measurement of arbitrary length. The first approach requires a low pass filter 23 with greater bandwidth than the second, and consequently it is more sensitive to random noise on the loop. Though less sensitive to noise, the second approach is slower.

The power spectrum of the sampled time function generated by *a/d* converter 25 is calculated digitally in computer 26, advantageously, by using a Fast Fourier Transform (FFT) subroutine to compute the discrete Fourier transform $G(\omega_j)$ of $g(t_i)$. The transform is stated as:

$$g(t_i) \longleftrightarrow G(\omega_j) \tag{19}$$

Conjugate multiplication of the transform produces the discrete power spectrum, $S_g(\omega_j)$, of $g(t_i)$.

$$\overline{S_g(\omega_j)} = G(\omega_j)\cdot G^*(\omega_j) \tag{20}$$

where $$\omega_j = 2\pi f_j. \tag{21}$$

The frequencies of the maxima of $S_g(f_j)$ can be substituted in the following equation, analogous to Equation (11), to estimate the distances to the impedance irregularities on the line:

$$\hat{d}_i = [\pi f_r(H_{max})_i]/[K_1(f_2-f_1)] \quad (i = 1,2, \ldots) \qquad (22)$$

where $(H_{max})_i$ = a harmonic number (integer) that corresponds to a maximum of $S_g(f_i)$.

As in the analog case, the power spectrum can be multiplied by a monotonically increasing function such as a ramp function, for example, to facilitate interpretation of the peaks even further.

With respect to both of the above-described implementations, the amplitude of the sinusoidal ripple caused by a fault at a given location approaches zero above a certain frequency, which depends on the distance to the fault, due to the attenuation of the line which increases monotonically with frequency. Variations measured above this frequency are caused only by impedance irregularities which are located closer to the measurement point than the fault. Higher harmonies generated by these variations tend to obscure the peak corresponding to the fault in the power spectrum. Consequently, it is advantageous to define a set of frequency bands which correspond to "distance windows" or cable pair sections which overlap and can be investigated for faults independently. A set of frequency bands and their corresponding distance windows are given in the Table of FIG. 10.

Pursuant to one aspect of the invention, a given fault located at a fixed distance from the central office is scrutinized through at least two of the distance windows. For example, consider a fault 7 kilofeet from the central office. When the frequency band 10–498 kHz is swept corresponding to the 4–8 kft distance window, the fault appears as a peak in the right side of the window as shown in FIG. 9A. When the frequency band 10–335 kHz is swept corresponding to the 6–12 kft distance window, the same fault appears as a peak in the left side of the window as shown in FIG. 9B.

A 95 percent accuracy with a resolution shorter than 1,000 feet (where resolution is defined as the minimum distance required between two irregularities in order to distinguish them) can be expected using the inventive fault locator on shorts, crosses and grounds which are less than 1,000 Ω and on opens which are greater than 10 Ω at distances less than 10 kilofeet. Approximately 60 percent of all Bell System loops are shorter than 10 kilofeet. Similar accuracy with a resolution shorter than 2,000 feet can be achieved on shorts, crosses and grounds which are less than 100 Ω and on opens which are greater than 50 Ω at distances less than 15 kilofeet. Approximately 80 percent of all Bell System loops are shorter than 15 kilofeet. Locating bench marks (known physical reference points) along a cable pair with the loop fault locator can be used to improve fault location accuracy.

It is seen that the objective of locating the conductor access point such as splice closure, terminal box or pedestal etc. that is nearest to the fault, is readily realized. From the access point, the appropriate portable test set can subsequently be used to pinpoint the exact trouble location.

The difficulty of discerning an indication of a fault directly from the swept frequency output $g(t)$ is illustrated in FIG. 3. Each of the four impedance irregularities in FIG. 1 produces a sinusoidal ripple across the swept bandwidth. The vector sum of these ripples comprises the function $g(t)$. Decomposing this function into its four sinusoidal components visually is extremely difficult. However, the four frequency peaks are easily identified in the power spectrum of FIG. 8.

FIG. 4 illustrates an analog implementation of the present invention in a centralized test center for loop testing. The equipment to the left of the voice frequency trunk 27 can be duplicated in a number of central offices. In each office any cable pair can be connected to return loss bridge 21 via the office switching equipment by means of a test selector. The swept frequency output $g(t)$ is transmitted in analog form to a single centralized test center for analysis by the equipment shown to the right of the voice frequency trunk 27. A similar illustration for the digital implementation is shown in FIG. 5. Voice frequency trunk A 28 is used for transmission of the signal $g(t)$ in analog form. Alternatively, voice frequency trunk B 29 is used for transmission of the signal $g(t)$ in digital form.

It is to be understood that the embodiments described herein are merely illustrative of the principles of the invention. Various modifications may be made thereto by persons skilled in the art without departing from the spirit and scope of the invention.

What is claimed is:

1. Apparatus for locating telephone cable faults detectable as one or more impedance irregularities in a cable pair, said pair having input terminals, comprising:

a return loss bridge having as a first leg thereof an impedance element approximating the characteristic impedance of said pair, and as a second leg thereof the impedance of said loop as seen across said terminals, means for generating a steady state cosine wave and for applying said wave to said bridge, means for periodically swept frequency modulating said steady state wave over a predetermined set of frequency ranges, thereby generating periodic time functions, means for determining the power spectra of said periodic functions, and means for identifying the frequencies of the maxima of said power spectra, said identified frequencies corresponding to distances along said pair of faults from said input terminals.

2. Apparatus for developing indicia of the distance of a telephone cable pair fault from a measuring point comprising:

means for applying a sinusoidal test signal concurrently to said faulted pair and to a standard circuit having a preselected impedance characteristic the approximate equivalent of the faulted pair under test;

means for repeatedly and substantially linearly varying the frequency of said test signal within a first predetermined frequency range, said range corresponding to the distances from said measuring point of the two ends of a first section of said faulted pair to be tested;

means for receiving the return signal resulting from said applied test signal, and for generating a spectral analysis of said return signal to determine its power spectrum, the power spectrum maxima each connoting an impedance irregularity on said faulted pair occurring at a distance from said measuring point determined by the value of the corresponding said frequency.

3. Apparatus pursuant to claim 2, further comprising means for repeatedly and substantially linearly varying the frequency of said sinusoidal test signal within each of a plurality of further predetermined frequency ranges, each of said further ranges corresponding to the distances from said measuring point of the ends of further sections of said faulted pair.

4. Apparatus pursuant to claim 3, wherein said predetermined frequency ranges overlap sufficiently to yield at least two indicia of the same impedance irregularity when said test signal is varied within said predetermined frequency ranges.

5. Apparatus pursuant to claim 4, further comprising means for multiplying said power spectrum by a monotonically increasing frequency function to compensate for the decrease in reflected amplitude of said return signal with increasing frequency of said frequency ranges.

6. Apparatus pursuant to claim 3, wherein all said frequency ranges have lower limits of not less than 10 kHz.

* * * * *